(12) United States Patent
Cote

(10) Patent No.: US 11,197,466 B2
(45) Date of Patent: Dec. 14, 2021

(54) PERCH FOR A BIRD FEEDER

(71) Applicant: BROME BIRD CARE INC., Knowlton (CA)

(72) Inventor: Paul L. Cote, Lac Brome (CA)

( * ) Notice: Subject to any disclaimer, the term of this patent is extended or adjusted under 35 U.S.C. 154(b) by 0 days.

(21) Appl. No.: 16/501,032

(22) Filed: Feb. 11, 2019

(65) Prior Publication Data
US 2019/0269105 A1 Sep. 5, 2019

Related U.S. Application Data

(63) Continuation of application No. 15/932,468, filed on Mar. 2, 2018, now Pat. No. 10,918,092.

(51) Int. Cl.
*A01K 39/012* (2006.01)

(52) U.S. Cl.
CPC .................. *A01K 39/012* (2013.01)

(58) Field of Classification Search
CPC .... A01K 39/00; A01K 39/01; A01K 39/0113; A01K 39/012
See application file for complete search history.

(56) References Cited

U.S. PATENT DOCUMENTS

| | | | | |
|---|---|---|---|---|
| 3,568,641 A | * | 3/1971 | Kilham | A01K 39/012 119/57.8 |
| 4,246,869 A | * | 1/1981 | Tobin, Jr. | A01K 39/012 119/57.8 |
| 4,355,597 A | * | 10/1982 | Blasbalg | A01K 39/012 119/57.8 |
| 4,690,101 A | * | 9/1987 | Kilham | A01K 39/012 119/52.2 |
| 4,829,934 A | * | 5/1989 | Blasbalg | A01K 39/012 119/57.8 |
| 4,940,019 A | * | 7/1990 | Coffer | A01K 39/00 119/52.2 |
| 4,977,859 A | * | 12/1990 | Kilham | A01K 39/012 119/52.2 |
| 5,062,388 A | * | 11/1991 | Kilham | A01K 39/012 119/52.2 |
| 5,095,847 A | * | 3/1992 | Coffer | A01K 39/00 119/52.2 |
| 5,105,765 A | * | 4/1992 | Loken | A01K 39/0113 119/57.9 |
| 5,123,380 A | * | 6/1992 | Edwards | A01K 39/012 119/52.2 |
| 5,195,460 A | * | 3/1993 | Loken | A01K 39/0113 119/57.9 |
| 5,207,181 A | * | 5/1993 | Loken | A01K 39/0113 119/57.9 |
| 5,215,039 A | * | 6/1993 | Bescherer | A01K 39/012 119/468 |

(Continued)

FOREIGN PATENT DOCUMENTS

CA 2687868 A1 * 6/2010 ........... A01K 39/012

*Primary Examiner* — Monica L Barlow
*Assistant Examiner* — Aaron M Rodziwicz
(74) *Attorney, Agent, or Firm* — Andrews Robichaud PC

(57) ABSTRACT

A perch configuration for a bird feeder, the bird feeder having a seed container and a seed access area to permit a bird to land thereon to feed from the seed access area, the perch member having a generally inverted U-shaped configuration whereby when a bird perches on the member, there are no sharp edges contacting the bird's claws.

16 Claims, 20 Drawing Sheets

(56) References Cited

U.S. PATENT DOCUMENTS

| | | | | |
|---|---|---|---|---|
| 5,235,935 A * | 8/1993 | Edwards | ............. | A01K 39/012 |
| | | | | 119/52.3 |
| 5,642,689 A * | 7/1997 | Harvey | ................ | A01K 39/012 |
| | | | | 119/57.8 |
| 6,834,616 B2 * | 12/2004 | Fort, II | ................ | A01K 39/012 |
| | | | | 119/53 |
| 6,957,626 B2 * | 10/2005 | Ela | ....................... | A01K 39/012 |
| | | | | 119/57.9 |
| 2002/0069829 A1 * | 6/2002 | McMahon | ............ | A01K 39/00 |
| | | | | 119/51.01 |
| 2003/0033985 A1 * | 2/2003 | Hardison | ............... | A01K 39/00 |
| | | | | 119/57.9 |
| 2005/0257749 A1 * | 11/2005 | Kuelbs | ................... | A01K 39/00 |
| | | | | 119/57.8 |
| 2006/0016400 A1 * | 1/2006 | Rich | ................... | A01K 39/012 |
| | | | | 119/57.8 |
| 2006/0065199 A1 * | 3/2006 | Davis | ................... | A01K 5/0225 |
| | | | | 119/51.01 |
| 2006/0118055 A1 * | 6/2006 | Kuelbs | ................... | A01K 39/00 |
| | | | | 119/57.8 |
| 2010/0031890 A1 * | 2/2010 | Vosbikian | ............ | A01K 39/012 |
| | | | | 119/52.4 |
| 2011/0100299 A1 * | 5/2011 | Colwell | ................ | A01K 31/12 |
| | | | | 119/52.2 |
| 2014/0261200 A1 * | 9/2014 | Tu | ....................... | A01K 39/012 |
| | | | | 119/57.8 |
| 2015/0334995 A1 * | 11/2015 | Cote | ................... | A01K 39/012 |
| | | | | 119/52.4 |
| 2019/0000045 A1 * | 1/2019 | Donegan | ................ | A01K 39/01 |

* cited by examiner

PERCH FOR A BIRD FEEDER

The present invention is related to U.S. application Ser. No. 15/932,468 filed Mar. 2, 2018, U.S. application Ser. No. 15/932,724 filed Apr. 12, 2018, U.S. application Ser. No. 15/932,980 filed Jun. 1, 2018 and U.S. application Ser. No. 15/999,997 filed Sep. 7, 2018, the contents of which are hereby incorporated by reference.

FIELD OF THE INVENTION

The present invention relates to bird feeders and more particularly, relates to an improved perch structure.

BACKGROUND OF THE INVENTION

The use of bird feeders is well known in the art. The feeding of birds, particularly during inclement weather, is widely practised. Most of the bird feeders comprise a container which will house the seeds or other bird feed and allow for distribution of the seed to the birds at positions whereby they can feed. Typically, the bird seed is allowed to feed by gravity to a position proximate to one or more bird perches upon which the bird can land and eat the seed.

Many different types of seed feeders are known and one particular type includes that which is known as "squirrel proof". These squirrel proof feeders incorporate a mechanism to prevent squirrels from feeding. Some of the mechanisms include weight sensitive technology which denies access to the seed when a weight above a certain predetermined amount lands on the perch. Other mechanisms use mechanical barriers such as baffles on poles.

In all instances, the bird feeders provide a perch area on which the birds can land and stay while they access the seed from the feeder. The perches may form a portion of the feeder itself or may be provided as a separate member.

One type of perch which is widely used is a stamped metal piece. With this process, the metal is cut or stamped and the piece is secured to the bird feeder. It has been noted by Applicant that such perches appear uncomfortable for some birds and they will not remain for very long on the perch.

SUMMARY OF THE INVENTION

It is an object of the present invention to provide a perch for a bird feeder and which perch will maximize comfort of the birds at the feeder.

According to one aspect of the present invention, there is provided, a bird feeder having a seed container and a seed access arrangement, a perch structure located proximate the seed access area to permit a bird to land thereon to eat from the seed access area, the improvement comprising a plurality of perch members, at least one of the perch members having a somewhat generally inverted U-shaped configuration whereby when a bird perches on the member, there are no sharp edges contacting the bird's claws.

As discussed above, the perch structure may form a portion of the feeder or alternatively, may be a separate component which is attached to the feeder.

In the embodiment described herein, the bird feeder will include a seed tube which has an open top and an open lower end. The seed tube is preferably cylindrical in configuration and may be formed of any suitable material with a preferred material being a transparent plastic material to provide visual access to the container's interior and thereby show the seed level.

A cover is designed to fit on top of the open top end of the seed tube. Preferably, the cover is removably attached to the seed tube and there are different arrangements known in the art. Preferably, the cover will be in a locking/unlocking relationship with the top of the seed tube.

Preferably, the bird feeder of the present invention uses a seed tube base which is removably attached to the open lower end. This presents the advantage that access may be had to the bottom of the seed tube where moisture may accumulate and result in spoilage of the seed.

In a preferred embodiment, the perch forms a portion of the shroud which surrounds the seed openings as will be described in greater detail hereinbelow. The perch may also function as a stand for the seed container. In a preferred embodiment, the perch or stand has a plurality of circular elements which extend completely about the seed container with a plurality of radial elements extending between the circular elements. Gaps are formed between the circular elements and radial elements.

Each of the circular elements and radial elements preferably is formed to have an inverted U-shaped configuration wherein there is provided a substantially flat upper surface upon which the birds would perch. Extending downwardly from each side of the upper surface are side walls which merge with the substantially flat upper surface to form rounded corners.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
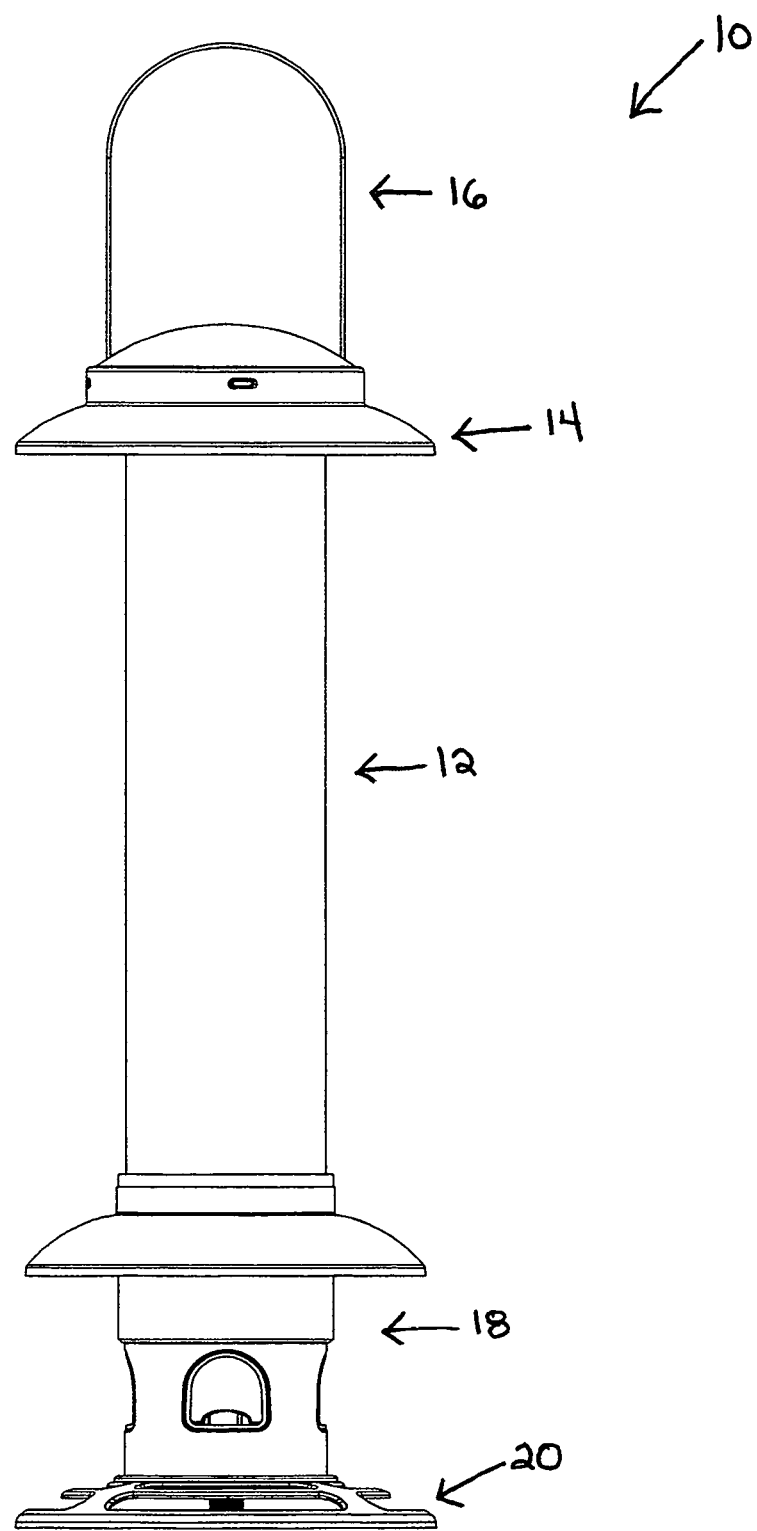
FIG. 1 is a side elevational view of a bird feeder according to one embodiment of the present invention.
Figure 2:
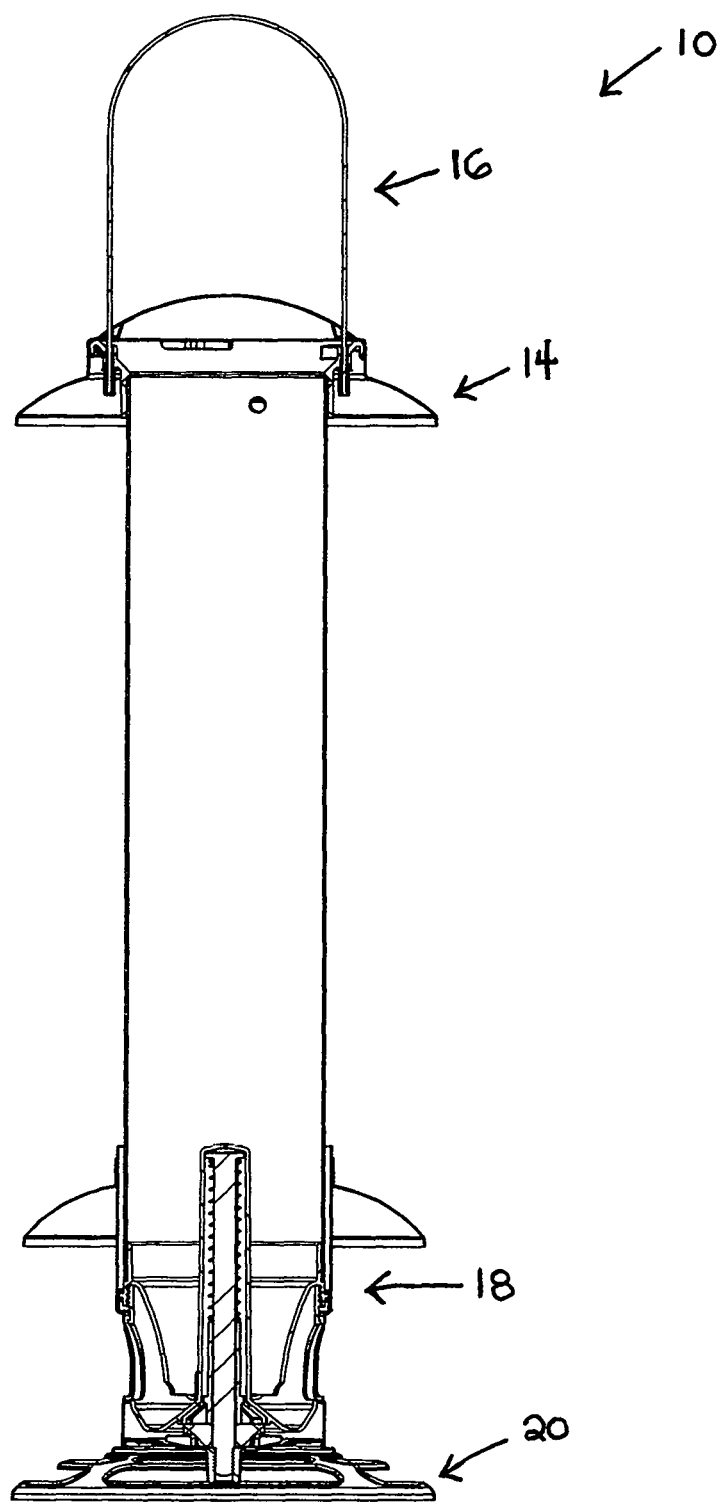
FIG. 2 is a longitudinal sectional view thereof.
Figure 3:
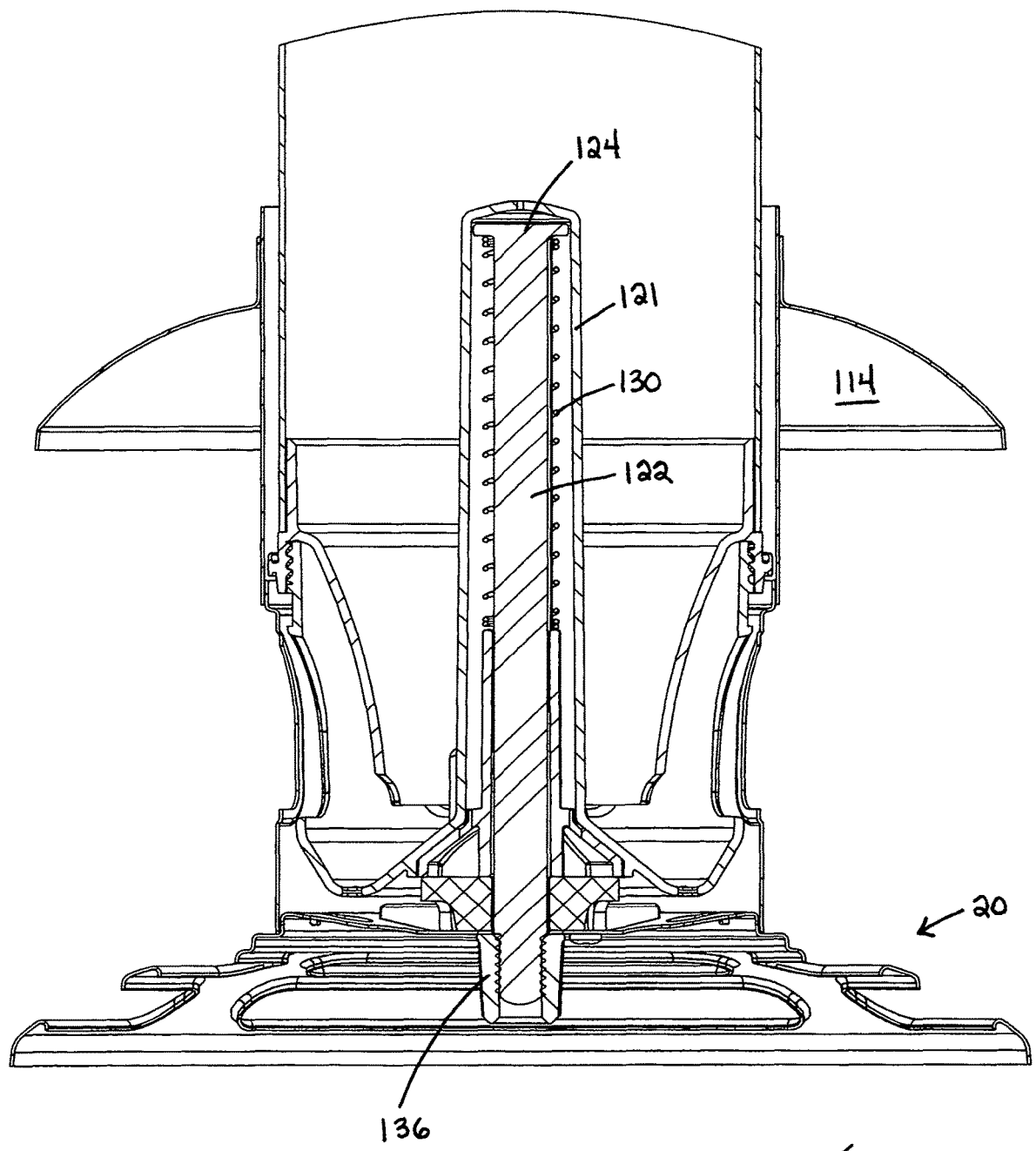
FIG. 3 is a longitudinal sectional view of the bottom portion of the bird feeder of FIG. 1.

Referring to the drawings in greater detail and by reference characters thereto, there is illustrated a bird feeder of the squirrel resistant type and which bird feeder is generally designated by reference numeral 10.

Bird feeder 10 is comprised of a seed tube generally designated by reference numeral 12, a cover generally designated by reference numeral 14, a hanger generally designated by reference numeral 16, a shroud generally designated by reference numeral 18, and a stand (forming a portion of shroud 18) generally designated by reference numeral 20. Bird feeder 10 also includes a funnel generally designated by reference numeral 22 and a seed tube base generally designated by reference numeral 24.

Seed tube 12 defines a seed container having a cylindrical wall 28. Seed tube 12 has an open upper end 30 and an open lower end 32.

Located at open upper end 30 is a an upper ring 34 which sits on seed tube 12. Upper ring 34 includes a lower circular wall 36 and an upwardly tapering wall 38. Upper ring 34 also includes an upper side wall 40 which has protrusions 42 extending outwardly therefrom. Preferably, there are provided a pair of such protrusions 42 each being diametrically opposed to the other. A pair of recesses 44 are provided in upper side wall 40 for reasons which will become apparent hereinbelow. Also, an upwardly extending wall 46 defines a slot 48. There are two such structures located on upper ring 34.

Figure 8:
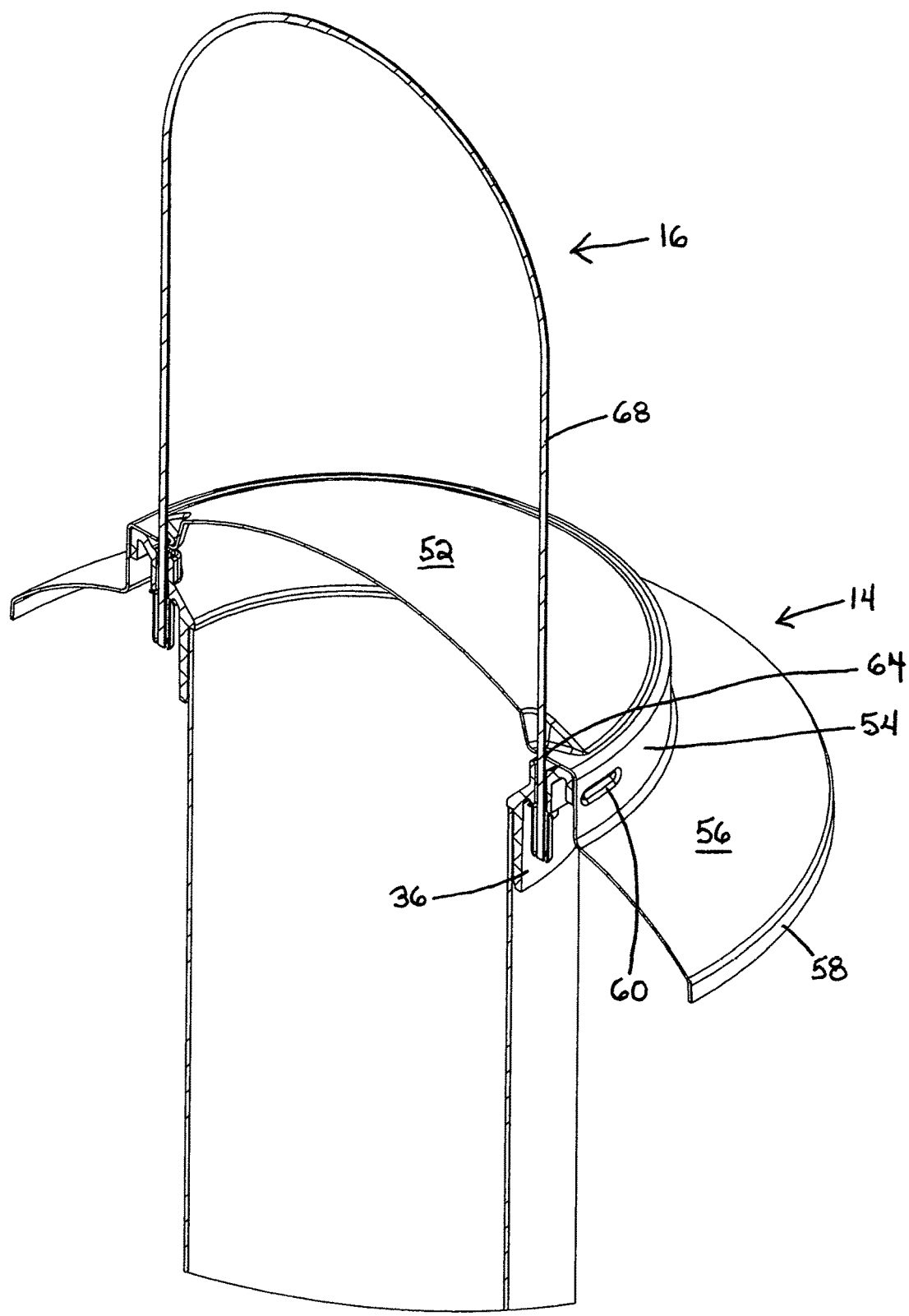
FIG. 8 is an enlarged perspective sectional view of the upper portion of a bird feeder according to an embodiment of the present invention.
Figure 9:
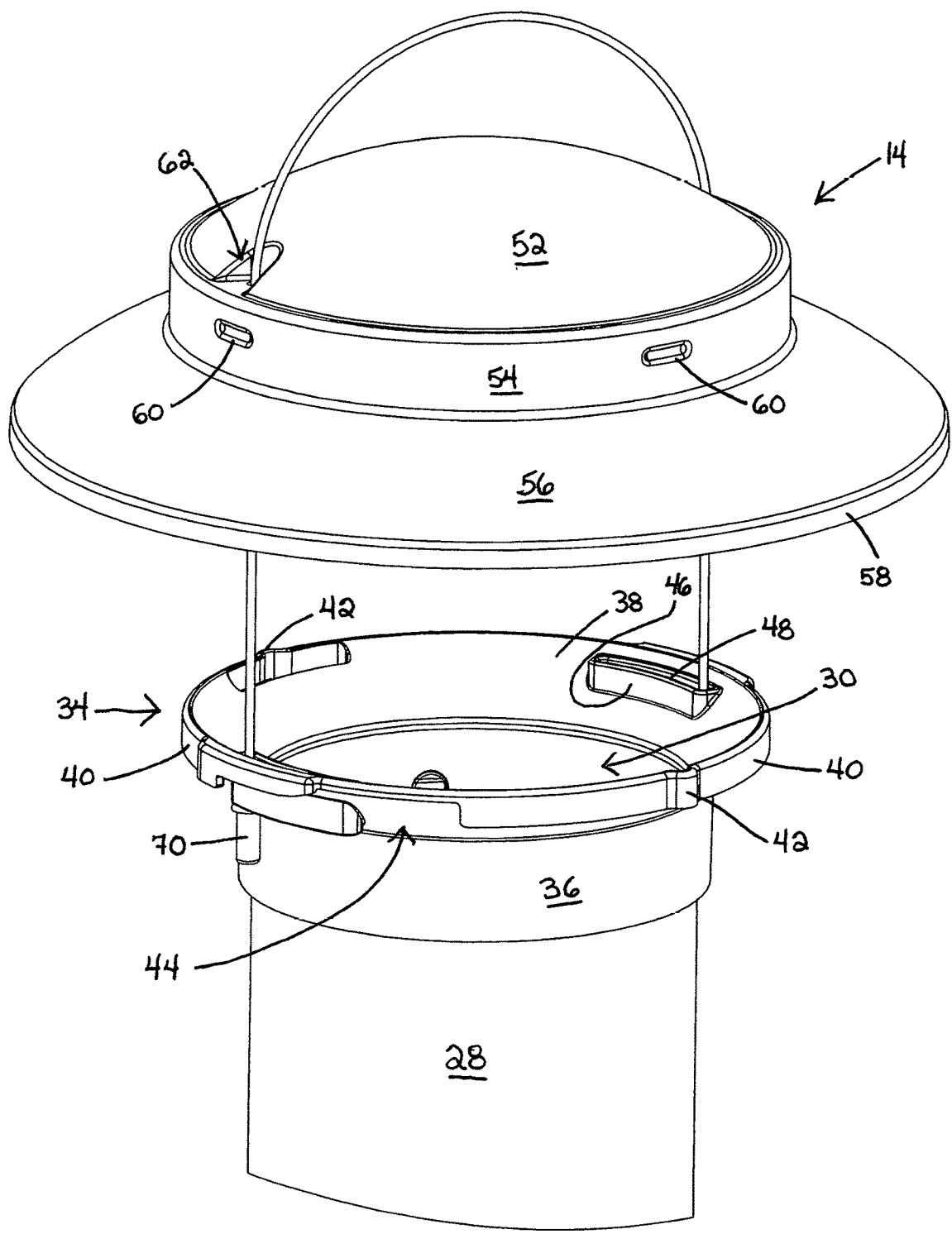
FIG. 9 is an enlarged perspective view of the upper portion of a bird feeder when the cover is not secured to the bird feeder.
Figure 10:
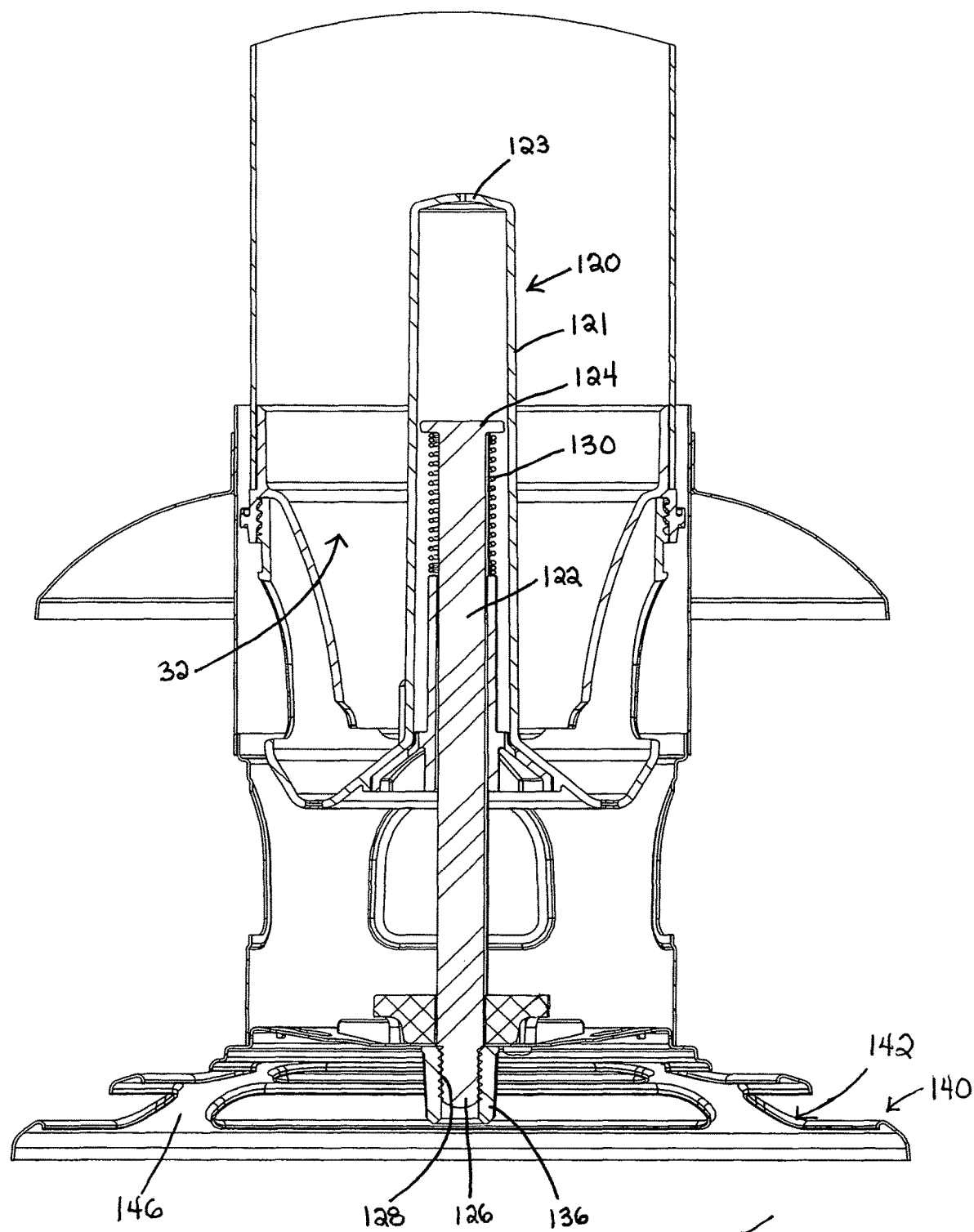
FIG. 10 is a further sectional view of the bird feeder when the shroud is misaligned with the seed tube.
Figure 11:
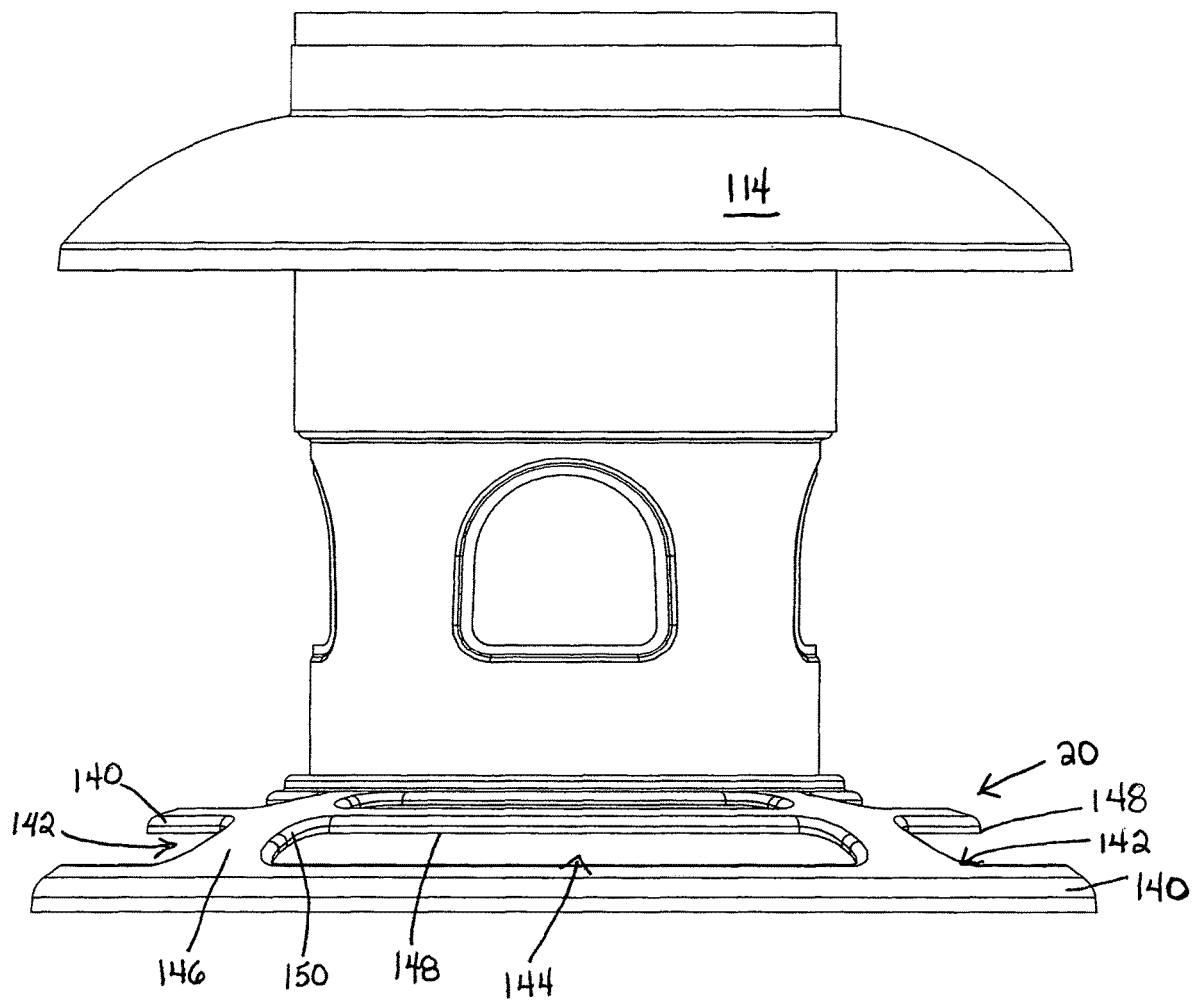
FIG. 11 is a side elevational view of the lower portion of the bird feeder.
Figure 12:
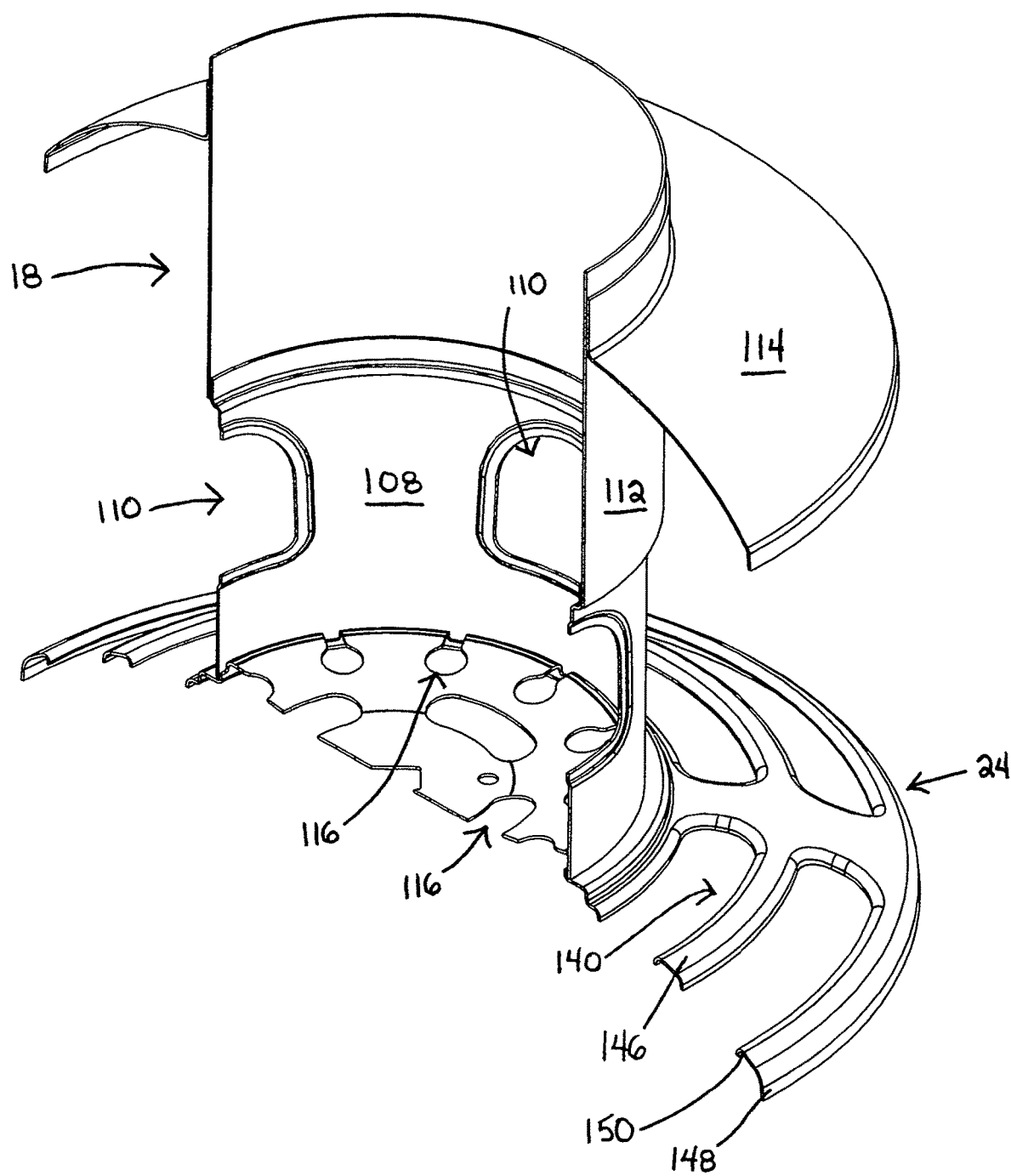
FIG. 12 is a side cutaway view of the lower portion of the bird feeder.

Cover 14, as may be seen in FIGS. 8 and 9, has a domed top wall 52 and a vertical side wall 54 extending downwardly therefrom. There is also provided a sloping wall 56 which terminates in a drip edge 58. Protrusions 60 are provided on the inner surface of vertical side wall 54. Preferably four such protrusions are provided. A pair of diametrically opposed protrusions 60 are designed to engage with protrusions 42 to hold the cover in position. A second pair of protrusions 60 engage within recesses 44 as is known in the art. Cover 14 also has a pair of recesses 62 formed in domed top wall 52 with an aperture 64 being located thereat.

Figure 15:
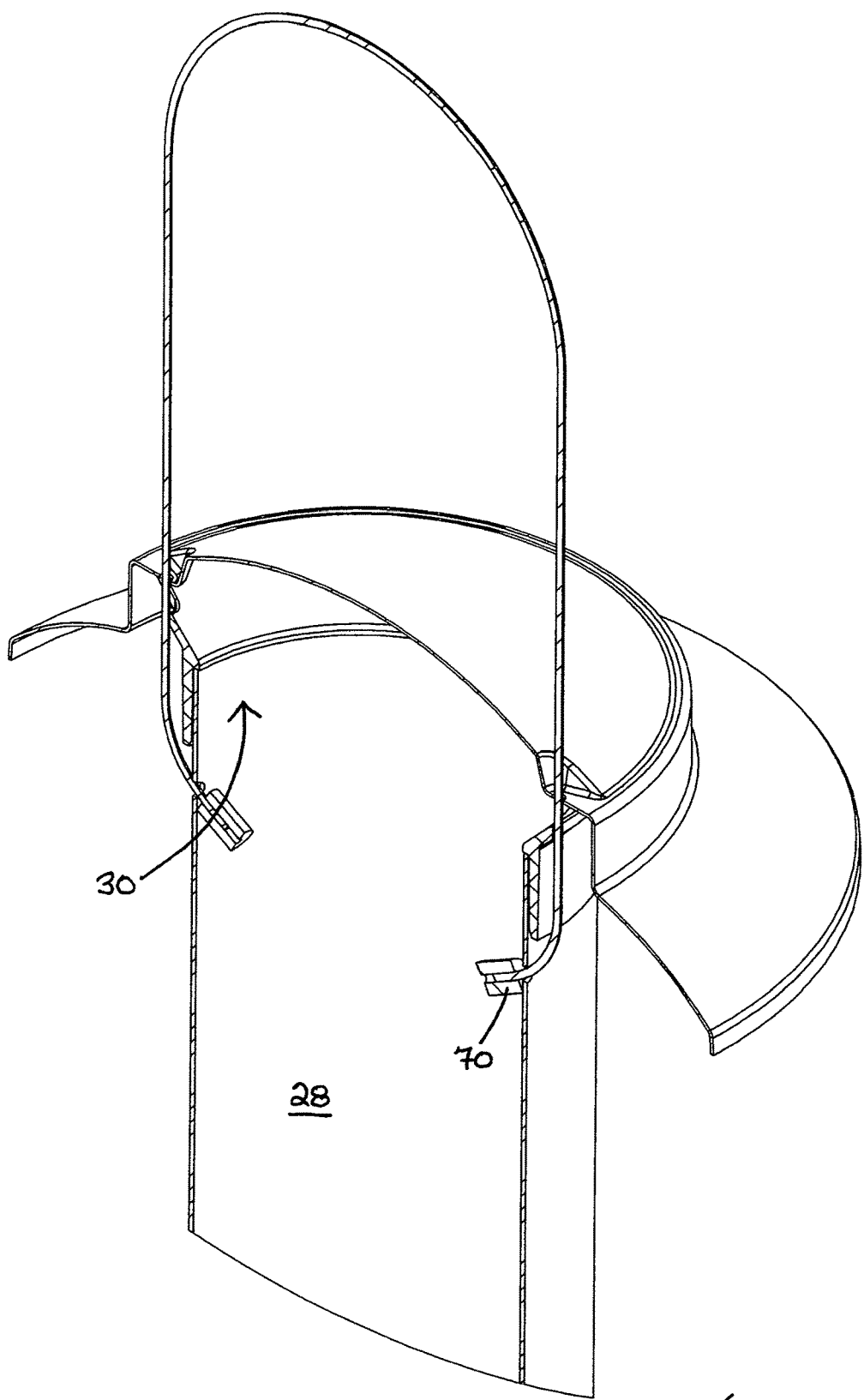
FIG. 15 is a perspective cutaway view of the upper portion of a further embodiment of the bird feeder.
Figure 16:
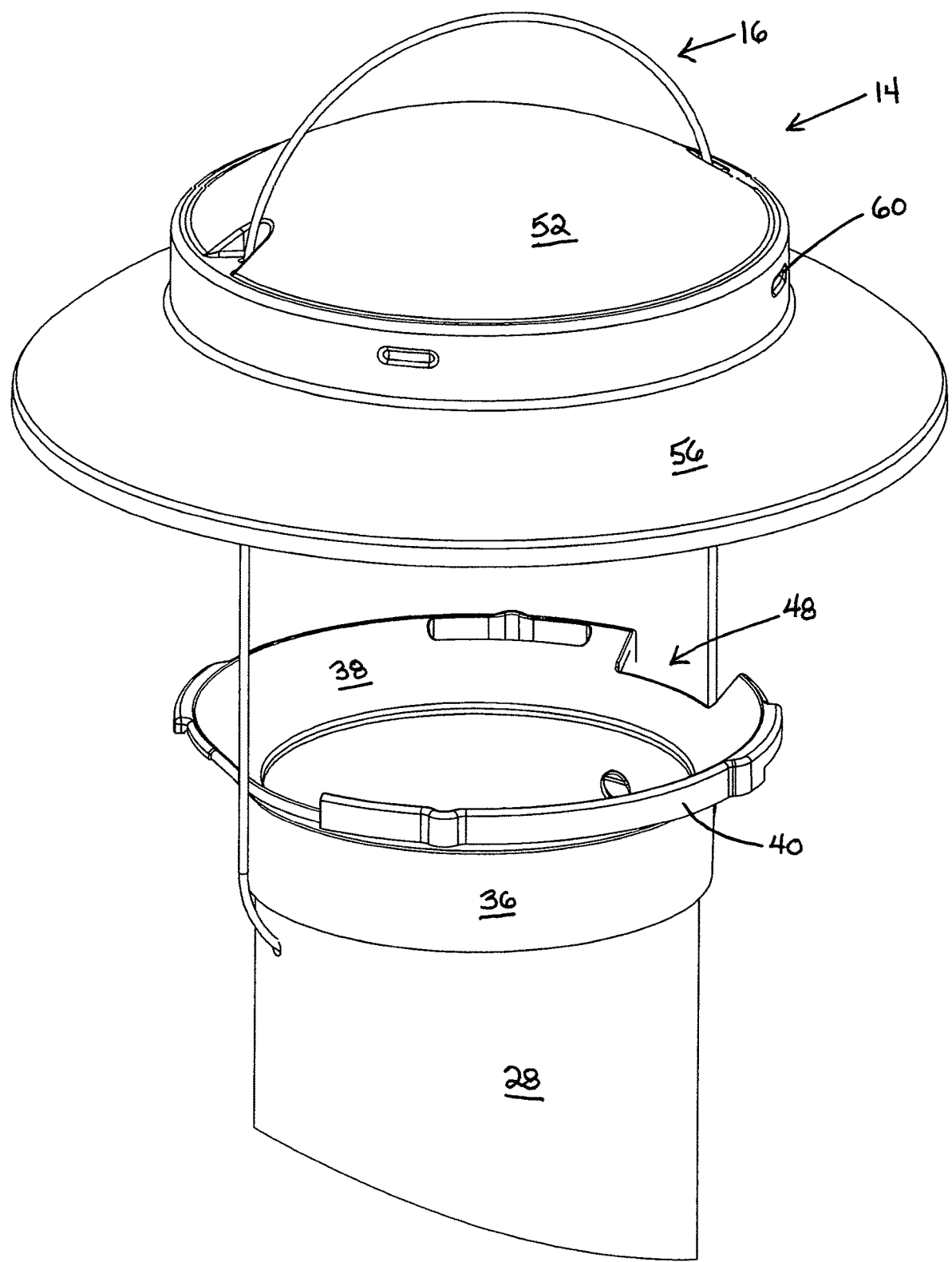
FIG. 16 is a partially exploded view of the upper portion of the bird feeder as shown in FIG. 15.

Hanger 16 comprises a relatively stiff wire 68. Wire 68 passes through aperture 64 and is provided with an enlarged portion 70 which sits under upper ring 34 and is thereby retained in position. In an alternative embodiment illustrated in FIGS. 15 and 16, wire 68 passes through cylindrical wall 28 with enlarged portion 70 retaining the wire.

Figure 17:
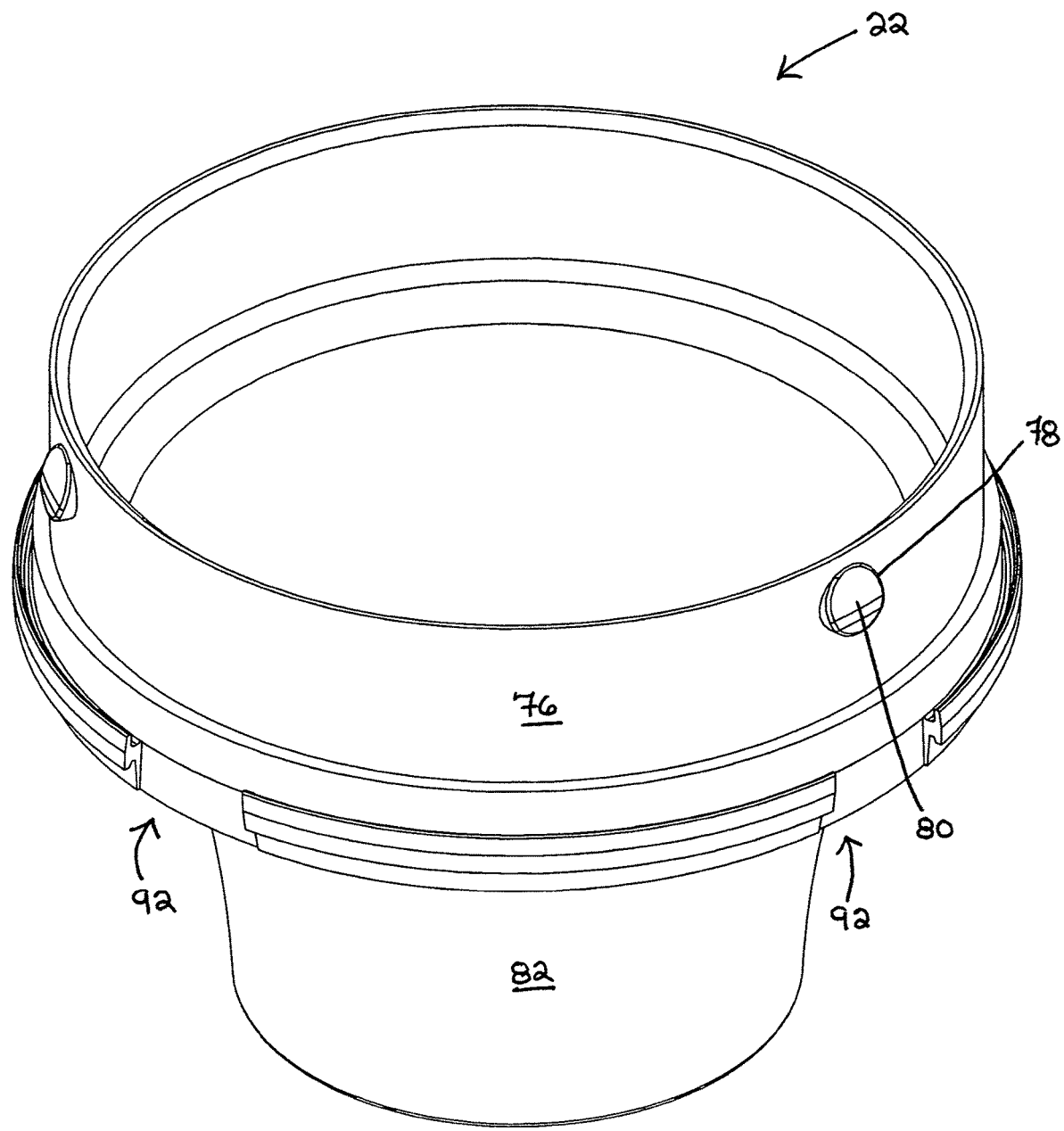
FIG. 17 is a perspective view of the funnel member of the bird feeder.
Figure 18:
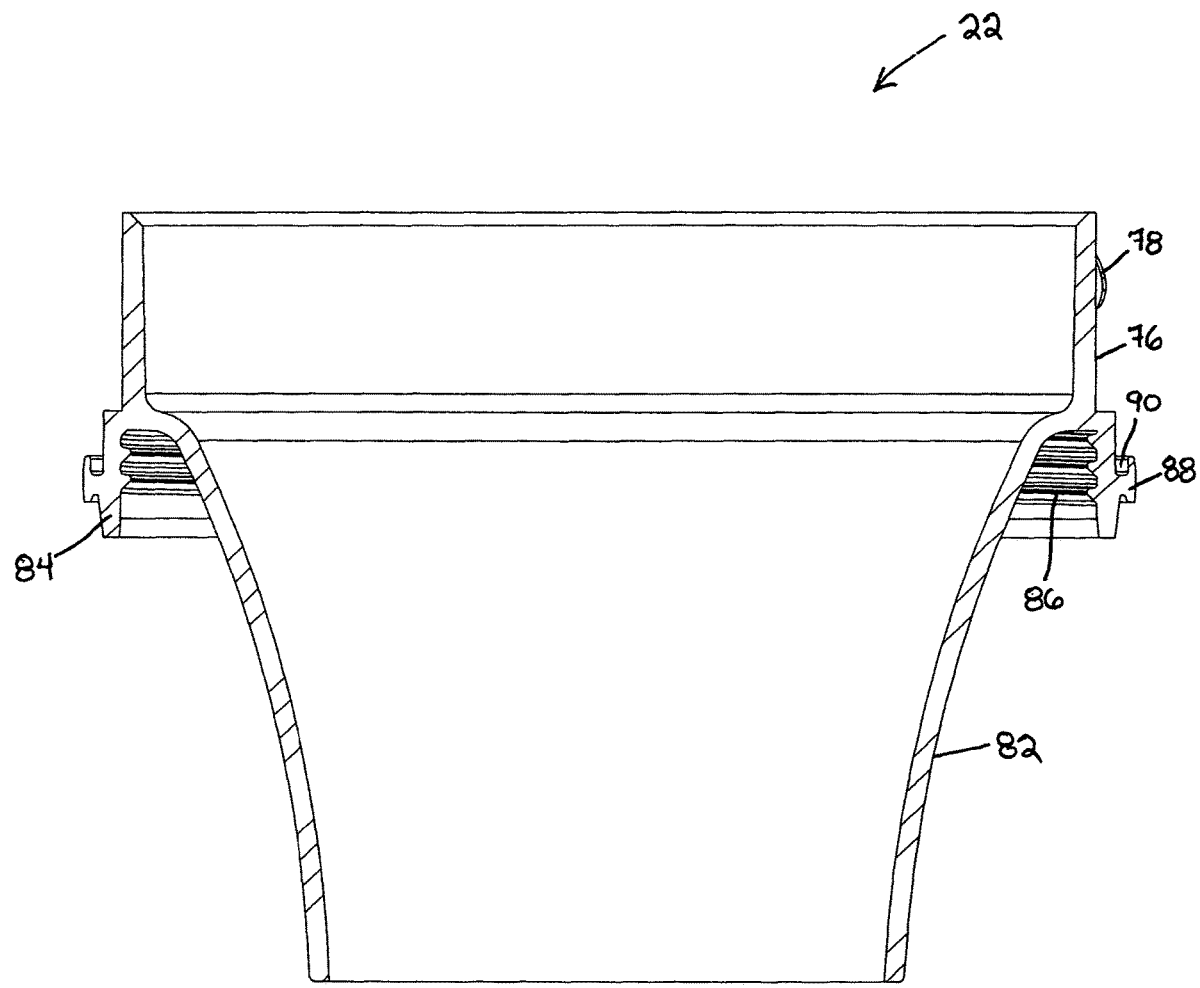
FIG. 18 is a sectional view thereof.
Figure 19:
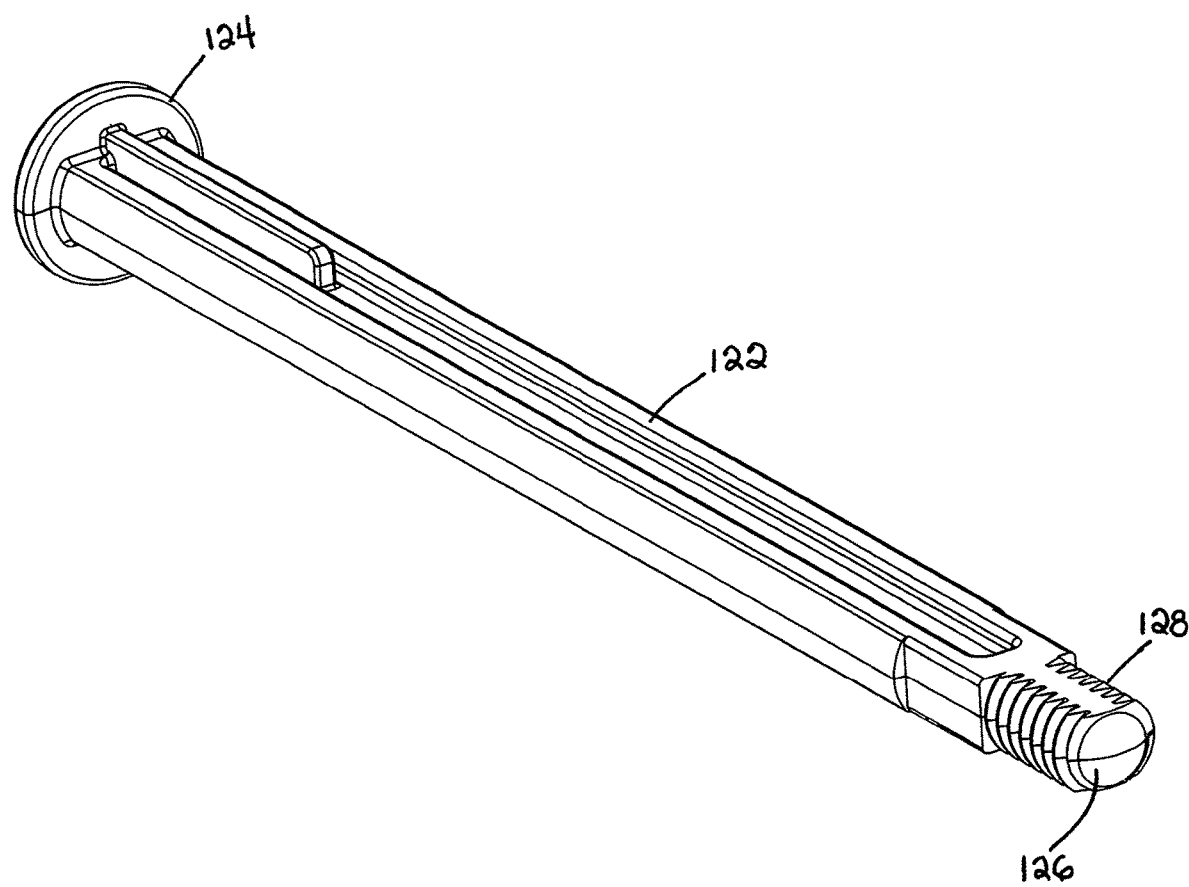
FIG. 19 is a perspective view of an inner rod member of the bird feeder.
Figure 20:
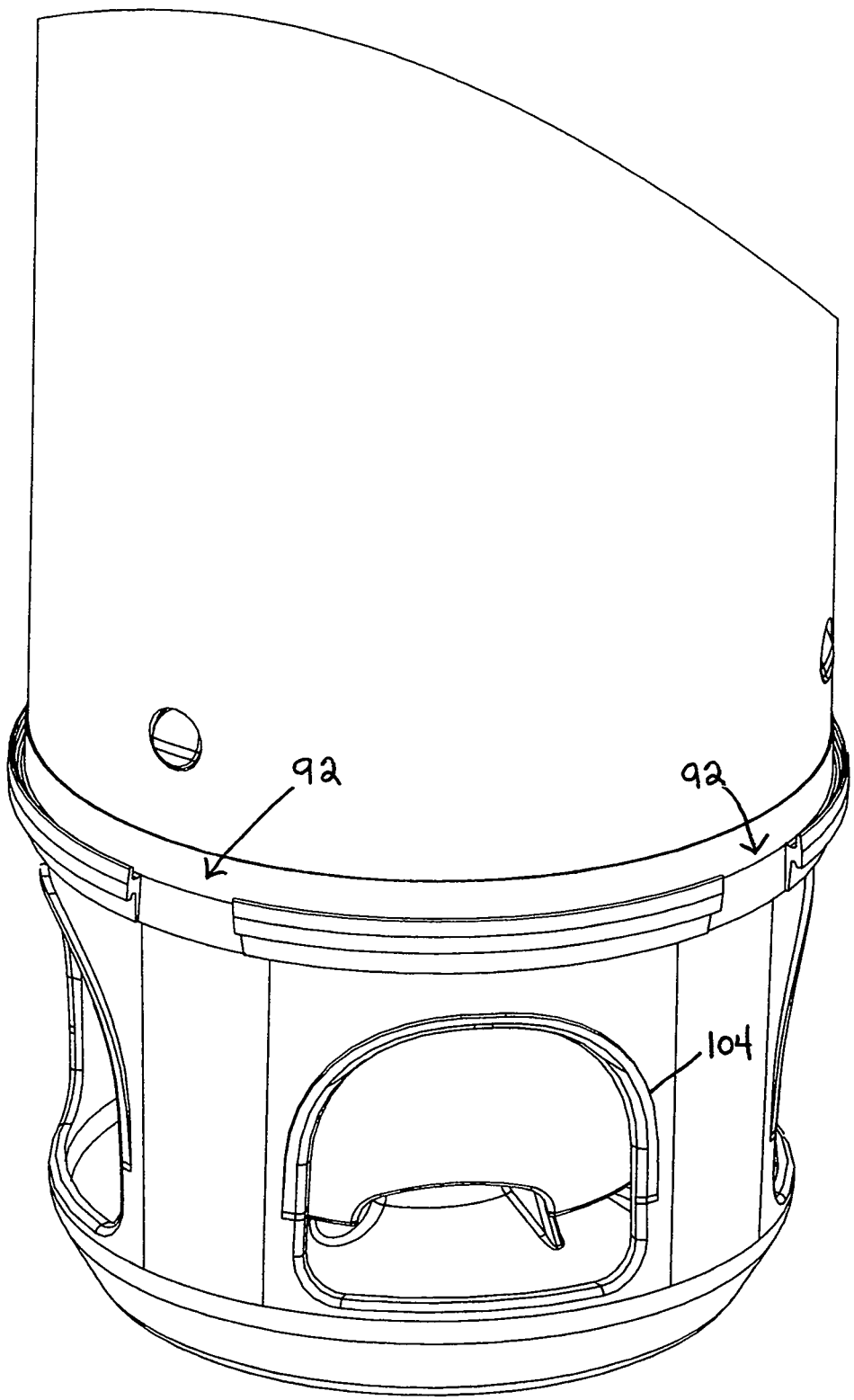
FIG. 20 is a perspective view of the base member and securement thereof to the funnel member and seed tube.

Funnel 22, best illustrated in FIGS. 17 and 18, has an upper wall 76 with a plurality of protrusions 78 being formed thereon. Each protrusion 78 is designed to fit within an aperture formed in the bottom portion of cylindrical wall 28 of seed tube 12. To aid in locking and unlocking, a sloping wall 80 is provided thereon.

Funnel 22 also has a lower wall 82 which is funnel shaped to help direct seeds as will be discussed hereinbelow. A middle wall section 84 extends downwardly from upper wall 76 and is spaced from lower wall 82. Threads 86 are provided on the interior of middle wall 84. A drainage member 88 extends outwardly from middle wall section 84 and has a U-shaped drainage channel 90 formed therein for reasons which will become apparent hereinbelow. It will be noted that there are gaps 92 between sections of middle wall section 84 to direct any water away from the feed openings.

Figure 13:
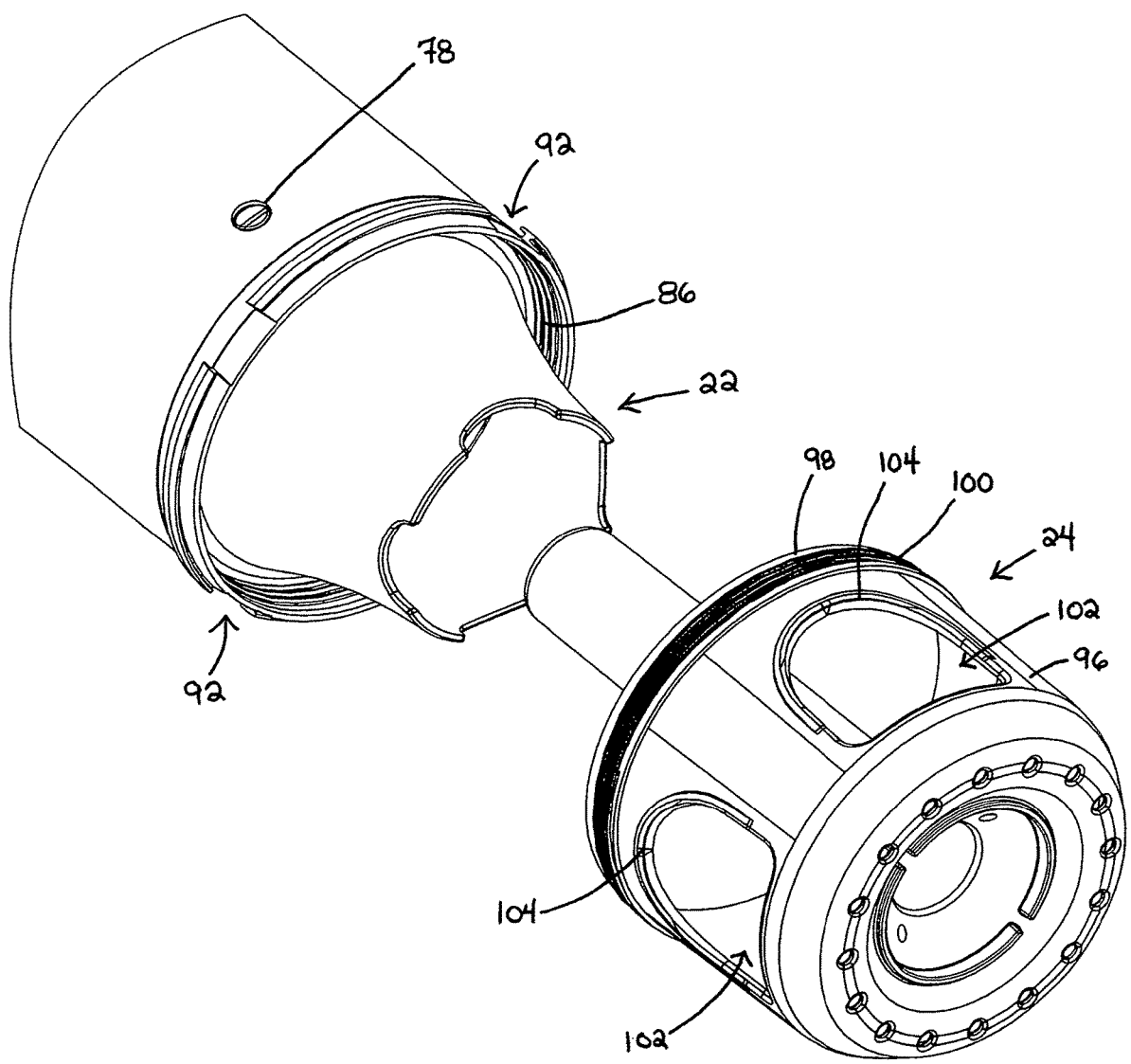
FIG. 13 is an exploded view showing the funnel and base portion of the bird feeder.
Figure 14:
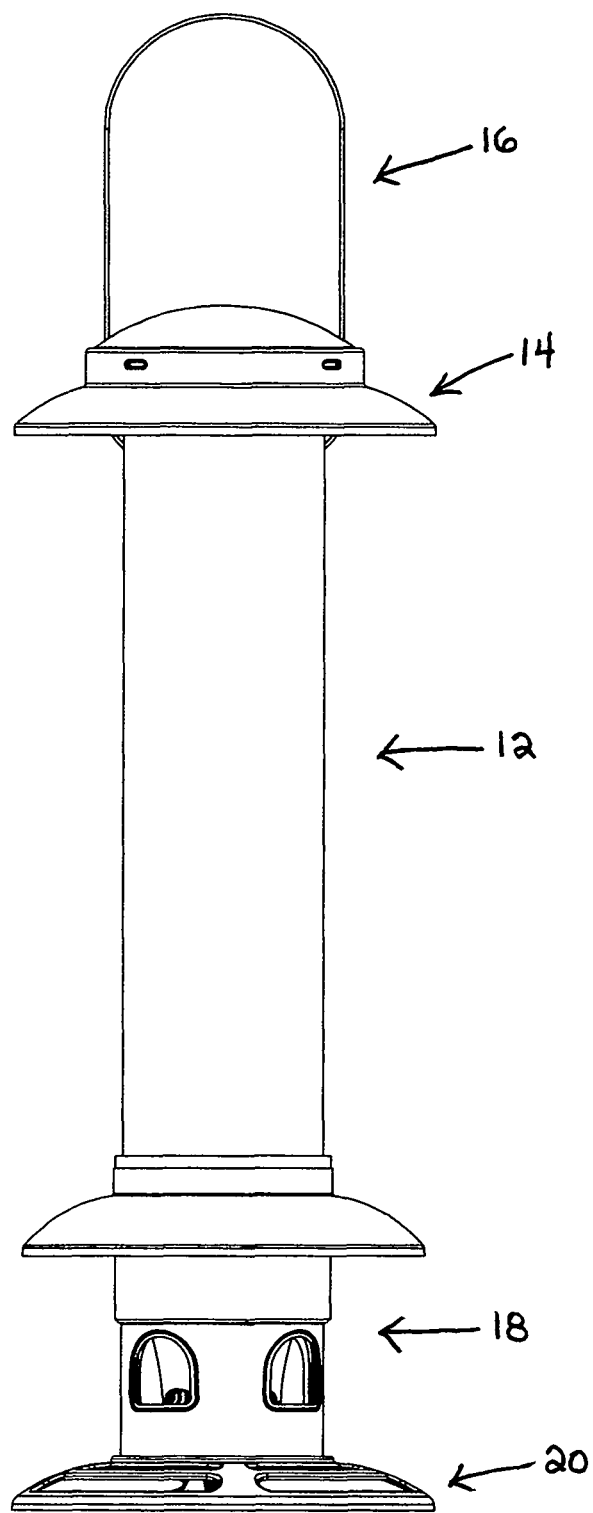
FIG. 14 is a side elevational view of the bird feeder.

Seed tube base 24, as may be seen in FIG. 13, has an upper side wall 98 which has a plurality of threads 100 thereon. Threads 100 are designed to engage with threads 86 formed on middle wall section 84 of funnel 22. A plurality of feed openings 102 are provided in side wall 96 of seed tube base 24. As will be noted, there is provided a rim protrusion 104 which extends partially about the upper portion of feed openings 102. This arrangement allows rainwater to pass to the side of the feed openings 102.

Shroud 18 has a lower side wall 108 with a plurality of feed openings 110 therein. An upper side wall 112 is directed to lower side wall 108. A baffle 114 extends circumferentially around the shroud and is located on upper side wall 112 such that it is above feed openings 110 to provide protection from the weather such as rain. It is obviously important that the baffle is located above the feed openings while also being close to the feed openings. An interior bottom wall has a plurality of drainage apertures 116 formed therein.

Located inwardly of the seed tube base is a longitudinally extending post generally designated by reference numeral 120. Post 120 is formed of a cylindrical wall 121 having a top wall 123. Located internally of post 120 is a rod 122 which has a flange 124 formed at the top end thereof. A lower portion 126 of rod 122 has screwthreads 128 formed thereon. Extending about rod 122 is a coil spring 130 which has a first end biased against top flange 124. A base member 132 is provided and is connected to the seed tube base by means of screws 134. A cap 136 is screwthreadedly engaged with lower portion 126 by screwthreaded engagement with screwthreads 128.

Figure 4:
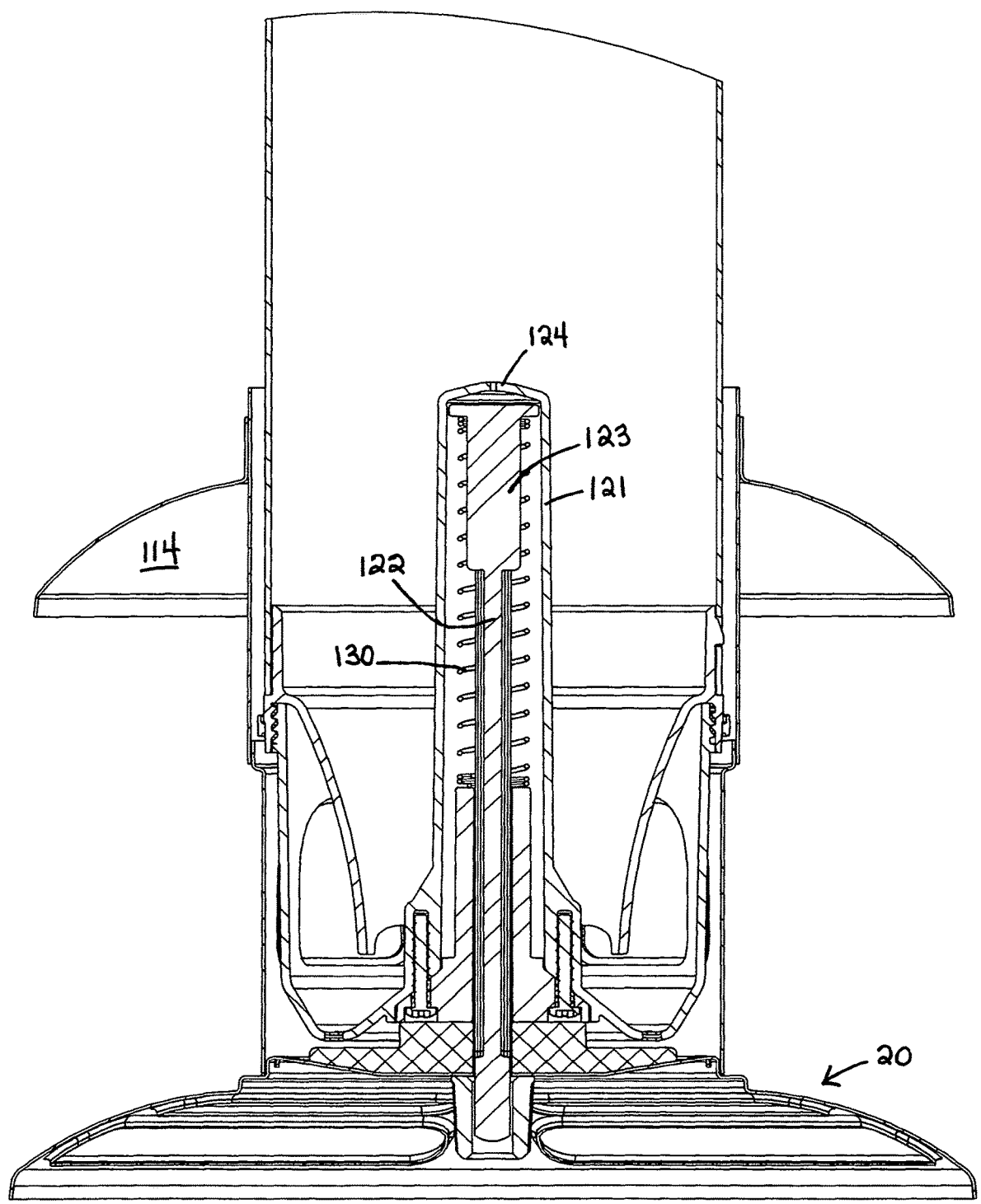
FIG. 4 is a longitudinal sectional view of the bottom portion of a further embodiment of a bird feeder according to the present invention.
Figure 5:
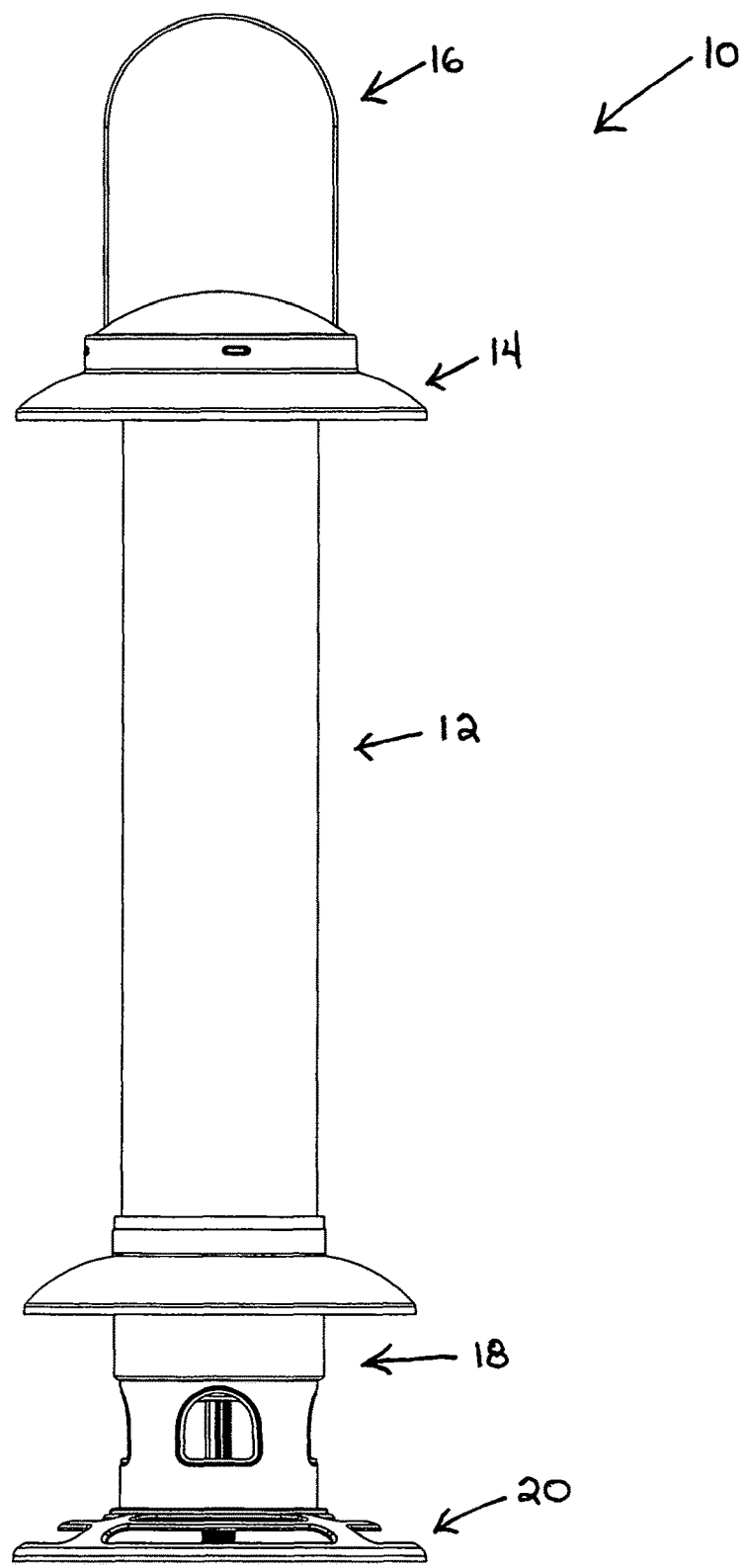
FIG. 5 is a side elevational view of the bird feeder of FIG. 4.
Figure 6:
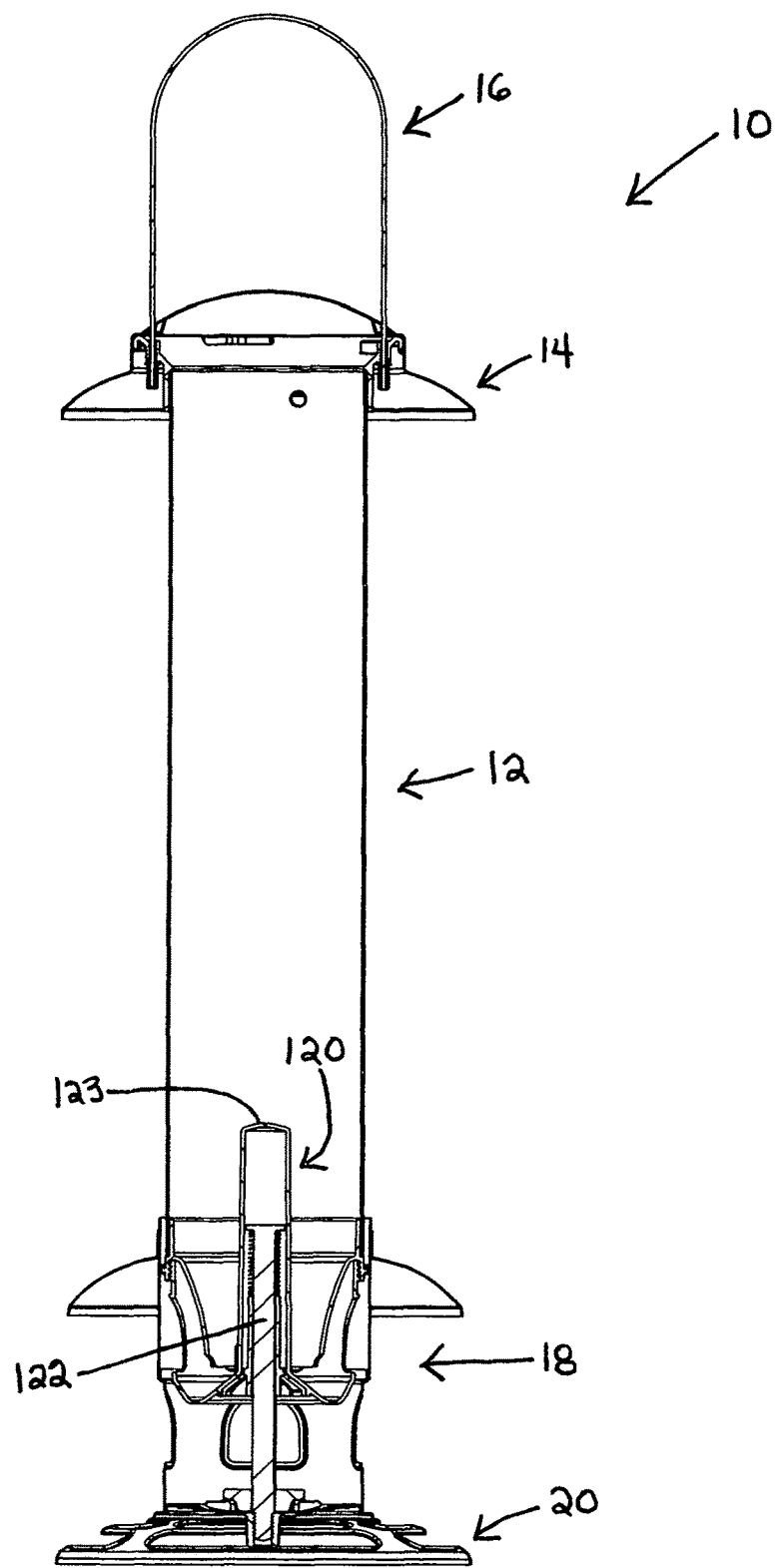
FIG. 6 is a longitudinal sectional view of the bird feeder of FIG. 5.
Figure 7:
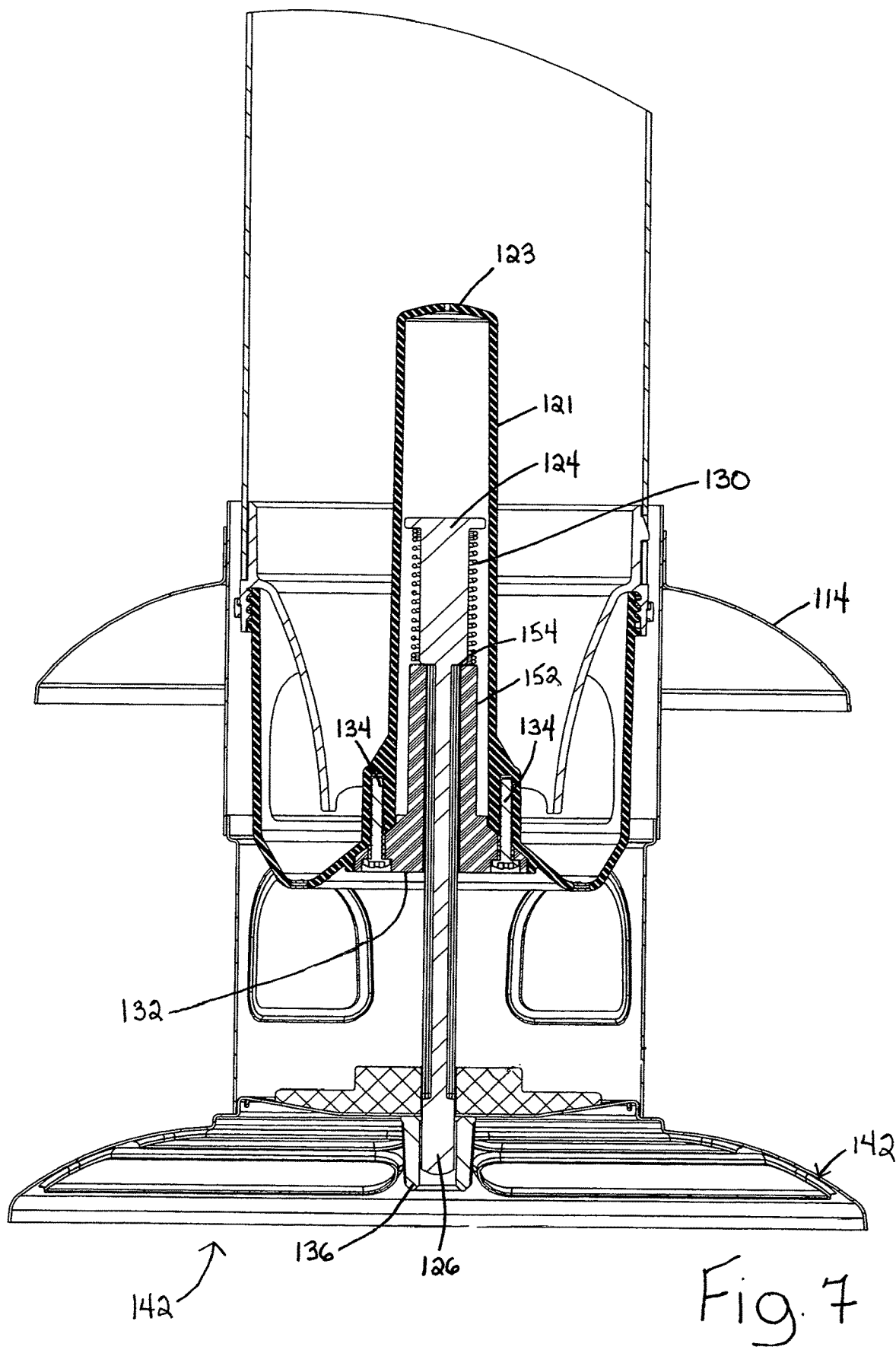
FIG. 7 is a longitudinal sectional view of the bottom portion of a bird feeder when the shroud is lowered, denying access to the seed within the bird feeder.

In the embodiment of FIG. 4, rod 122 has an enlarged portion 123 at its upper end.

Stand 20, as seen in the drawings, also functions as a perch for the birds. Stand or perch 20 is comprised of a plurality of circular elements 140 which extend completely around the shroud. In the illustrated embodiment, there are two such circular elements although more may be utilized if so desired. A plurality of radial elements 142 extend between and connect circular elements 140. A plurality of gaps 144 are formed by this structure.

Each of circular elements 140 and radial elements 142 is designed to have somewhat flat upper surface 146. On each side of upper surface 146, a pair of side walls 148 extend downwardly. The transition between upper surface 146 and side walls 148 is provided by arcuate corners 150.

The arrangement is such that no sharp corners are present when the birds land on circular elements 140 or radial elements 142. The birds appear to be more comfortable with this arrangement.

It will be understood that the above described embodiment is for purposes of illustration and that changes and modifications may be made thereto without departing from the spirit and scope of the invention.

I claim:

1. A bird feeder having
    a seed container;
    a seed access arrangement; and,
    a perch structure located proximate said seed access arrangement to permit a bird to land thereon to eat from said seed access arrangement,
    wherein the perch structure comprises a plurality of perch members, at least one of said plurality of perch members having an inverted U-shaped cross-sectional configuration defining arcuate corners and a pair of side walls that each extend downwardly and terminate at an edge, the inverted U-shaped cross-sectional configuration adapted to receive a bird's claws.

2. The bird feeder of claim 1 wherein said at least one of said plurality of perch members has a substantially planar upper surface, the pair of side walls merging arcuately with and extending downwardly from said planar upper surface.

3. The bird feeder of claim 1 wherein the plurality of perch members further comprises at least a first perch member and a second perch member, the first and second perch members arranged concentrically such that the second perch member is radially farther from the seed access arrangement than the first perch member.

4. The bird feeder of claim 3, wherein the second perch member is positioned lower than the first perch member.

5. The bird feeder of claim 3 wherein the perch structure further comprises at least one radial element that extends radially from the seed access arrangement to the second perch member.

6. The bird feeder of claim 1, wherein the perch structure further comprises at least one radial element that extends radially from the seed access arrangement.

7. A bird feeder comprising
a seed container;
a seed access portion associated with said seed container, said seed access portion permitting access to seeds from within said seed container; and,
a perch located proximate said seed access portion, said perch comprising at least one member having an inverted U-shaped cross-sectional configuration defining arcuate corners and a pair of side walls that each extend downwardly and terminate at an edge, the inverted U-shaped cross-sectional configuration adapted to receive a bird's claws.

8. The bird feeder of claim 7, wherein the at least one member further comprises at least a first member and a second member, the first and second members arranged concentrically such that the second member is radially farther from the seed access portion than the first member.

9. The bird feeder of claim 8, wherein the second member is positioned lower than the first member.

10. The bird feeder of claim 8 wherein the perch further comprises at least one radial element that extends radially from the seed access portion to the second member.

11. The bird feeder of claim 7, wherein the perch further comprises at least one radial element that extends radially from said seed access portion.

12. The bird feeder of claim 7 wherein said perch comprises:
a plurality of circular elements extending around said seed container; and,
a plurality of radial elements extending between said plurality of circular elements,
wherein at least one of said plurality of circular elements have said inverted U-shaped cross-sectional configuration defining arcuate corners and a pair of side walls that each extend downwardly and terminate at an edge, the inverted U-shaped cross-sectional configuration adapted to receive the bird's claws.

13. The bird feeder of claim 12, wherein the at least one of said plurality of circular elements further comprises at least a first circular element and a second circular element, the first and second circular elements arranged concentrically such that the second circular element is radially farther from the seed access portion than the first circular element.

14. The bird feeder of claim 13, wherein the second circular element is positioned lower than the first circular element.

15. The bird feeder of claim 12, wherein at least one of said plurality of radial elements extends radially from said seed container.

16. The bird feeder of claim 13 wherein at least one of said plurality of radial elements extends radially from the seed access portion to the second circular element.

* * * * *